Nov. 7, 1961  F. S. LAPEYRE ET AL  3,007,801
PROCESS FOR THE RECOVERY OF OYSTER MEATS
Filed Aug. 17, 1960  9 Sheets-Sheet 1

INVENTORS
FERNAND S. LAPEYRE,
JAMES M. LAPEYRE
LEROY E. DEMAREST &
ROBERT F. COURET
BY Wilkinson, Mawhinney & Theibault
ATTORNEYS Nov. 7, 1961 F. S. LAPEYRE ET AL 3,007,801
PROCESS FOR THE RECOVERY OF OYSTER MEATS
Filed Aug. 17, 1960 9 Sheets-Sheet 2

Fig. 2

INVENTORS
FERNAND S. LAPEYRE,
JAMES M. LAPEYRE,
LE ROY E. DEMAREST
& ROBERT F. COURET
BY Wilkinson, Mawhinney & Thibault
ATTORNEYS

United States Patent Office 3,007,801
Patented Nov. 7, 1961

3,007,801
PROCESS FOR THE RECOVERY OF OYSTER MEATS
Fernand S. Lapeyre, 1224 Octavia St.; James M. Lapeyre, 13 Richmond Place; Leroy E. Demarest, 4856 Desire Drive; and Robert F. Couret, 5964 Argonne St., all of New Orleans, La.
Filed Aug. 17, 1960, Ser. No. 53,573
10 Claims. (Cl. 99—195)

The present invention relates to Process for the Recovery of Oyster Meats, and is a continuation-in-part of our similarly entitled copending application, Serial No. 609,248, filed September 11, 1956, now abandoned.

Oysters of the Atlantic and Gulf of Mexico area species have a two-valved shell which encloses a soft body. The body of this sedentary inhabitant of inland waters rests on a cup-like shell or valve. The other shell or valve is usually flat. The narrower end of the shell is the anterior end. The broad, rounded end is the posterior. The valves, at the anterior end, are held together at a narrow hinge by an elastic ligament.

Shells consist of layers of organic substance, conchiolin, impregnated with calcium carbonate and small quantities of other mineral salts secreted by the mantle.

The composition, chemically, of the oyster meat is substantially as follows:

|   | Percent |
|---|---|
| Protein | 8–11 |
| Carbohydrates | 3.7–9.6 |
| Glycogen | [1] 0.4–9.5 |
| Fat | 1.2–2.5 |
| Mineral salts (ash) | 0.9–3 |
| Water | 76–[1] 89 |

[1] Summer months.

Also contains traces of sodium, potassium, calcium, magnesium, chlorine, bromine, iodine, phosphorus, sulphur, iron, copper, zinc, such contents varying with native water.

Oysters open by relaxing the single adductor muscle, called the "eye," which passes through the body to connect the shells. The spring-like action of the elastic ligament at the hinge forces the valves apart and the shell opens.

An oyster will close and hermetically seal its shell in the presence of mechanical disturbance, changes in light, or irritating subtances. These conditions are sensed by the two rows of tenacles along the outer edge of the mantle which embraces the body. Closure occurs when striated fibers of the adductor muscle contract and pull the two valves together.

Out of water the oyster thus sealed will retain water and survive about one week at 65° F.; about three weeks at 45° F.; and as long as four months when kept at just a few degrees above freezing. However, warming, shaking, or rough handling will cause the adductor to relax, valves to gap, water to be lost, and subsequent death of the oyster.

Except when in undisturbed enjoyment of its natural habitat, a live oyster keeps its shells so tightly closed as to require the application of great force to pry the shells open.

When an oyster is removed from its shell, it immediately begins to "bleed," losing much of its juices and liquid with consequent loss of weight and flavor. Ideally, therefore, an oyster should be eaten immediately upon its shells being opened and the meat removed therefrom. Hence the popularity of the "oyster bars."

These factors have posed problems in connection with the economical marketing of oysters at a distance from the sea regions where they abound. The oysters must be shipped in their shells under refrigeration, they must be forcibly opened, and, in order to preserve yield and flavor, must be immediately consumed.

Hitherto, most oysters have been opened manually and either sold for relatively immediate consumption or have been processed and canned. Lately devices have been utilized to open oysters by mechanical means but only after steaming (Harris Patent 2,608,716).

Manual opening of oysters involves great expense. Inevitably, the meat is mutilated by the knives used in prying open the shells and in detaching the adductor muscle or "eye" from the shell. Even if frozen within a short time of opening, there is loss of yield and flavor because of "bleeding" of the juices and liquid. The operation of manual opening is unhygienic, and great care must be taken to preserve the meat until consumption because of the tendency towards rapid spoilage of raw meats once they are removed from the shells or valves.

The manual opening of oysters is difficult and costly, and on that account, commercial producers often steam the oysters in order to render manual opening easier. However, the steaming of an oyster has many disadvantages. Steaming causes the oyster to "bleed" even while still within its shells, and upon opening of the shells the juices and liquids are irretrievably lost. Steaming causes the meat to shrivel, and the partial cooking of the meat deprives the oyster of its marketability as a fresh, raw oyster. When oysters are pre-steamed, they are usually canned and processed within the can to kill bacteria, and the resulting product is commonly regarded as inferior to a fresh, raw oyster. The steaming, though it may render opening of the shell easier, still does not prevent mutilation of the meats from the knives used in the process of manual opening.

Also, pre-steaming of the oysters does not always sufficiently diminish the adherence of the adductor muscle, or "eye" to the shells. Accordingly, when the shells are forced apart by the shear force produced, for instance, by tumbling of the oysters according to the Harris patent, the adductor muscle is at times torn from the meat by reason of its adherence to one of the shells. When this happens, a very significant loss in yield results and the "eye" (regarded by some connoisseurs as the choicest portion of the oyster) is irretrievably lost.

In tumbling, shells are apt to fall upon previously separated meats and to cut or puncture the meats, thus producing even more rapid "bleeding."

It is an object of the invention to provide a method of shucking oysters whereby "bleeding" is eliminated or minimized and the original weight, flavor and value of the oyster thus preserved and made to survive the opening or shucking process.

It is also an object of the invention to provide a process and/or machine whereby mutilation of the oyster meat is eliminated or minimized and whereby the adductor muscle or "eye" is preserved as an integral part of the oyster meat.

It is a further object of the invention to provide a process and/or apparatus for the treatment of oysters whereby the meat within the closed shells is solidified, or converted initially to a semi-solid state in which the liquid content will not flow on the opening of the shells, and by which the oysters may be shucked, and the oyster meats and the shells separated and removed to different destinations.

A still further object of the invention is to achieve the foregoing purposes effectively and economically and resulting in the production of oyster meats of high marketable value.

With the foregoing and other objects in view, the invention will be more fully described hereinafter, and will be more particularly pointed out in the claims appended hereto.

In the drawings, wherein like symbols refer to like or corresponding parts throughout the several views.

According to the process of this invention the oyster meats are solidified, as by freezing, in the closed shells as a preliminary step prior to the opening or shelling of the oysters. Subsequent to such freezing operation the oysters may be shucked in any desired manner, for instance, manually by the use of a knife inserted between the shells for the purpose of prying the valves apart. However, we have found it more expeditious to conduct the shucking or opening operation by machine in which the oysters are subjected, after freezing or solidification, to impact shock.

Moreover we have found that when oysters are frozen within their shells, the adductor muscles and hinge ligaments or cartilage become brittle and susceptible to detachment by stresses produced by impact shock. Accordingly, when stress of a shear nature is produced by the impact of tumbling the frozen whole oysters, the shells are more easily forced apart and the adductor muscles are more easily disengaged from the shells. Moreover, the frozen meat is delivered from the shells whole and in a solid state unable to lose weight through "bleeding."

Not only is the hard frozen meat less susceptible to mutilation by accidental contact with the sharp edges of the shells, but we have devised an improved apparatus for tumbling the oysters whereby the chances of such accidental contact of meat and shell are greatly minimized.

It is believed that in the process according to the invention the hinge ligament is broken almost upon the first fall of the oyster in the tumbler. The shells are temporarily held together by the adductor muscle and by the fact of the meat and shells having been frozen into an integral whole. As the tumbling continues, the meat begins to thaw and when just sufficient thawing has taken place to allow room for slight movement of the meat within the shell, the shear stress produced by the fall of the oyster incident to the tumbling action will disengage the ends of the adductor muscle from the shells and will break any adherence of the frozen meat from the shell. The shells will then separate from each other delivering a meat which is still substantially frozen solid. The process offers the further advantage of individually frozen meats, rather than a frozen block of oyster meats as would be the case if the oysters were frozen only after the removal of the shells. The ultimate consumer may therefore thaw only the number of oysters required at one particular time.

As a second form of a process according to the invention the same may include the following steps:

First: The freezing of live oysters within their shells.

Second: The subjection of the oysters to shear stress through impact or other means while the oyster begins to thaw, in order to break the hinge ligament or cartilage, to detach the adductor muscle from the shells, and to force the shells apart.

A third example of the method consists in steps first and second above set forth together with the following further step:

Third: The separation of the loose frozen meats from the empty shells.

We envision that the second and third stages of the process may be accomplished either in one mechanical unit provided both with tumbling impact means to produce shear stress and with separating means, or by two mechanical units wherein the tumbling impact means and the separating means are incorporated in separate devices used successively.

The drawings illustrate apparatus combining both the tumbling means and the separating means.

Referring more particularly to that form of machine shown in the FIGURES 1 to 6 inclusive, 15 designates an oyster freezing unit of any appropriate character and 16 a chute or conveyor input connecting with the unit 15 and entering the higher induction end of a rotary tumbling inclined drum 17. The drum is carried upon rollers 18 journaled in appropriate brackets upon the internal side walls of the water or brine tank 19.

The drum 17 may be driven by any appropriate means, for instance, by the encircling drive belts 20 which are also trained over drive sheaves 21 fixed to a power shaft 22 driven by a drive motor 23.

Within the drum are affixed spiral lifting vanes 24 which are preferably perforated. Extending through the lower portion of the drum but entirely independent thereof and separated therefrom is an oyster meat recovery flume 25 which may be carried in the end walls of the tank 19. The lower end wall 27 is provided with an opening 26 through which the flume 25 is fitted and beyond the flume are arranged a number of spaced inclined drain rods 28 disposed at least partially above a drain basin 29 which connects with a return pipe 30 by which water or brine may be recirculated to the tank 19 by means of a pump 31, driven by a motor 32, and a riser pipe 33 having an open upper end disposed over the tank.

Figure 6:
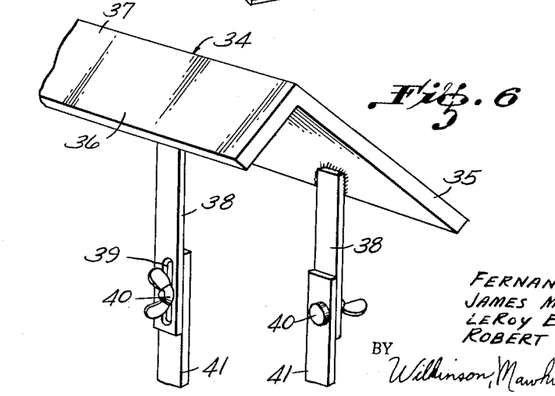
FIGURE 6 is a fragmentary isometric view of the anvil showing a form of adjusting means therefor.

Within the drum or cylinder 17 and carried by the flume 25 is an anvil 34 consisting of plates 35 and 36 meeting in a ridge 37. The anvil 34 is affixed to movable legs 38 having slots 39, as shown in FIGURE 6, to receive bolts 40 carried by fixed legs 41 which are affixed to the flume 25.

A shell conveyor 42 is mounted to move transversely on an inclination within the tank 19 beyond the discharge or lower end of the drum 17. The upper end of the conveyor 42 encircles a drive drum 43 driven by a motor 44. At its lower end the conveyor 42 extends about an idler drum 45, shown in FIGURE 4 as being appropriately journaled in the lower portion of the tank 19.

A suitable number of refrigerating coils 46 may also be arranged in the tank 19 and connected to a refrigeration unit 47 located just outside a side wall of such tank 19.

In operation of this form of device, it will be understood that the tank 19 is filled to a suitable height with appropriate liquid, for instance, a brine solution in water appropriate for being maintained at a temperature in the vicinity of the freezing point of oysters, although not necessarily at or below such freezing point. The desired refrigerating temperature will be maintained by means of the unit 47 and the coils 46.

The oysters are delivered by the oyster freezing unit by way of the chute or conveyor into the higher receiving end of the drum or cylinder 17 which is preferably imperforate. The drum extends, at least at its lower part, into and below the liquid level in the tank 19, the liquid level being determined by the flume 25 which is a half-cylindrical pipe open at its upper portion into which the liquid in the tank 19 may flow, the flume 25 also being preferably inclined downwardly to the opening 26.

Figure 1:
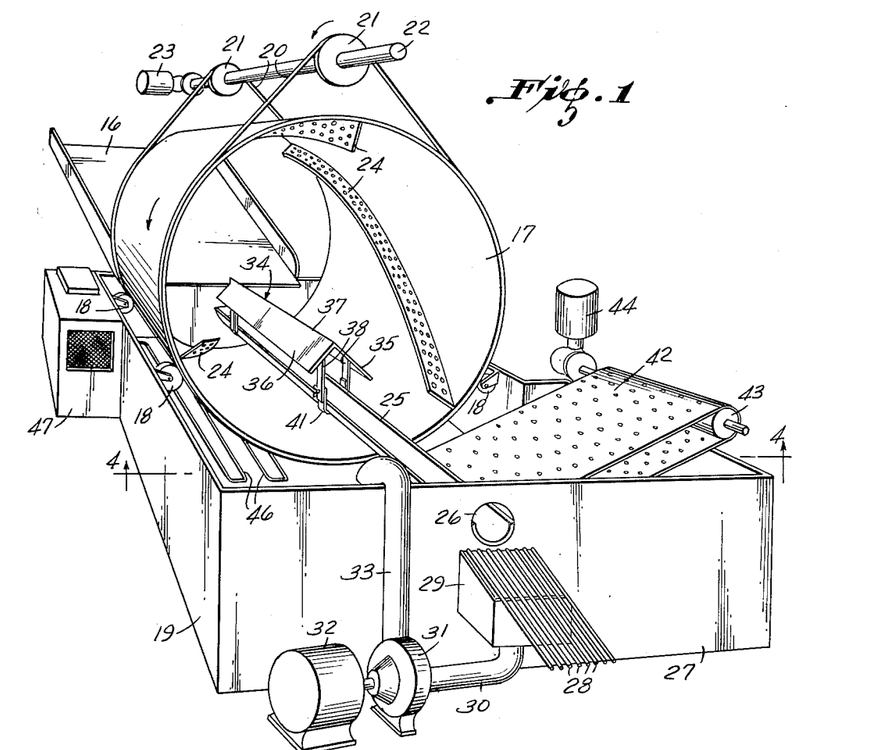
FIGURE 1 is a perspective view of a machine for shucking oysters according to one form of the invention.
Figure 2:
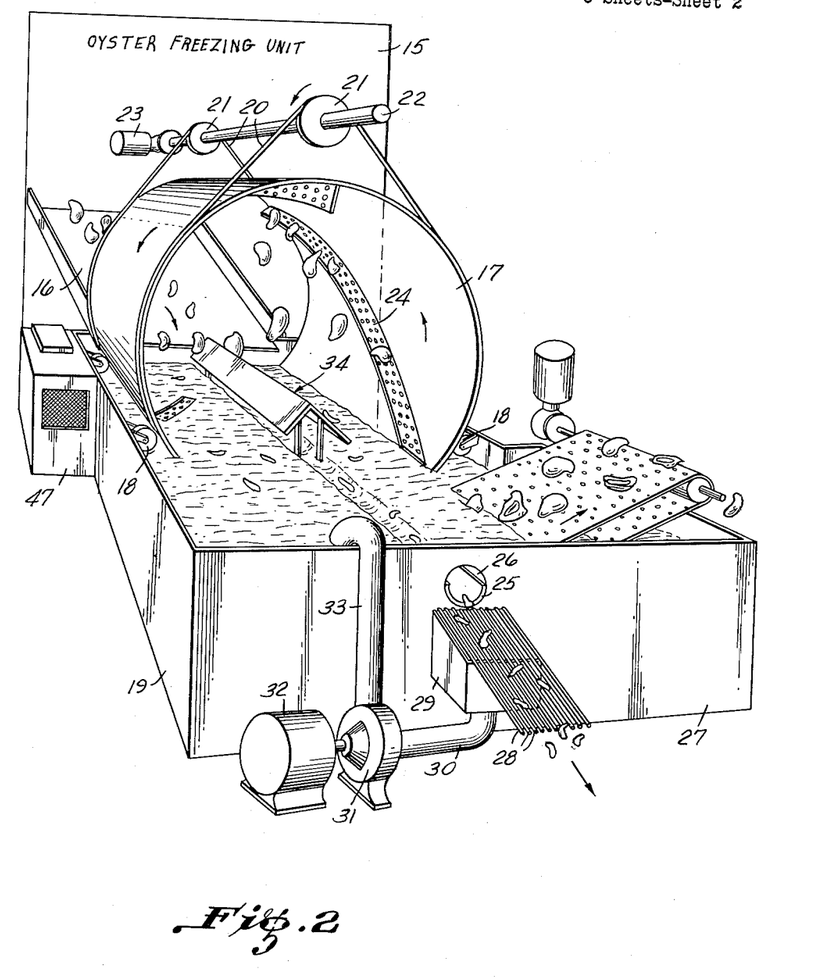
FIGURE 2 is a similar view illustrating the brine solution in the tank and oysters and oyster meats in the process of being shucked and separated pursuant to the improved process.
Figure 3:
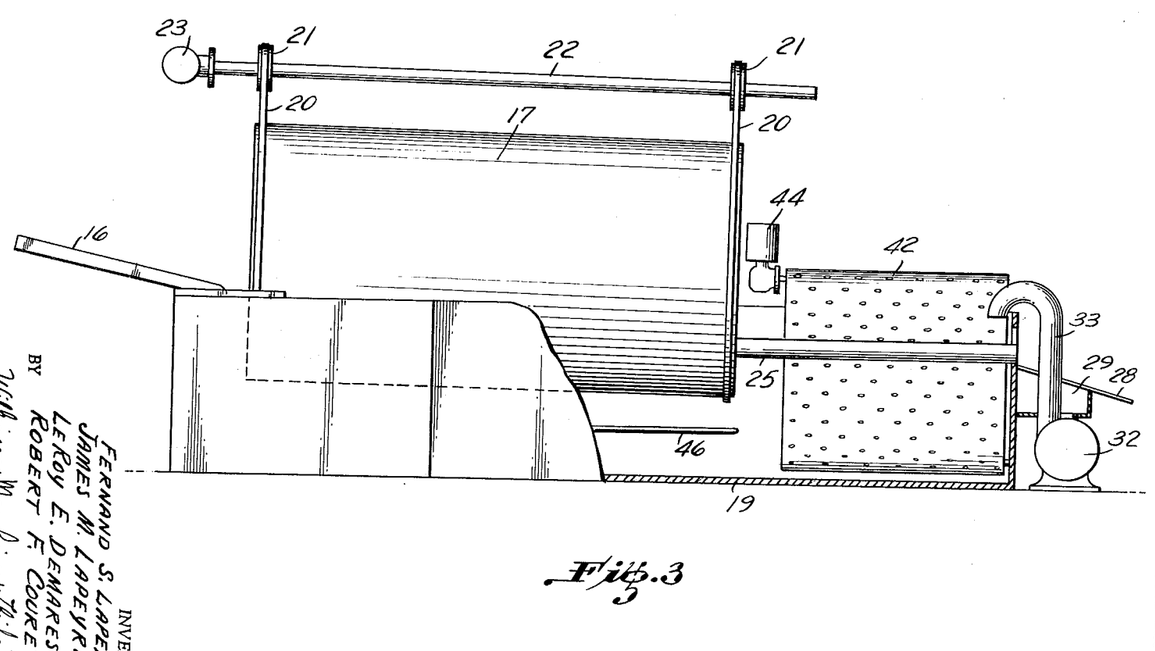
FIGURE 3 is a side elevational view, with parts broken away and parts shown in section of the form of machine according to FIGURES 1 and 2.
Figure 4:
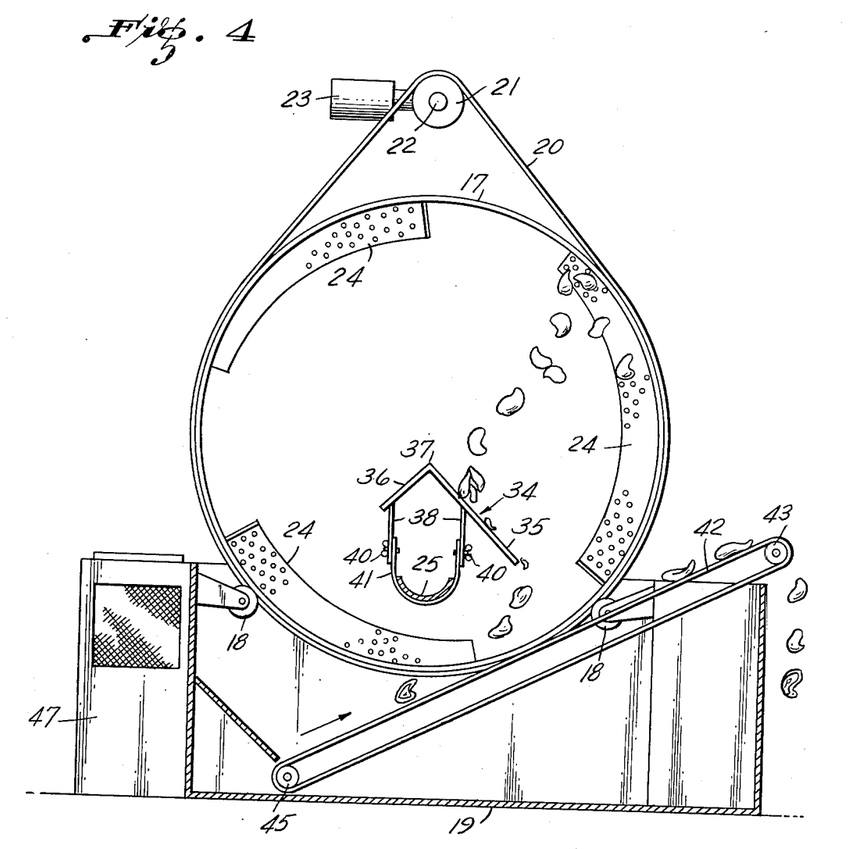
FIGURE 4 is a cross-sectional view taken on the line 4—4 in FIGURE 1.
Figure 5:
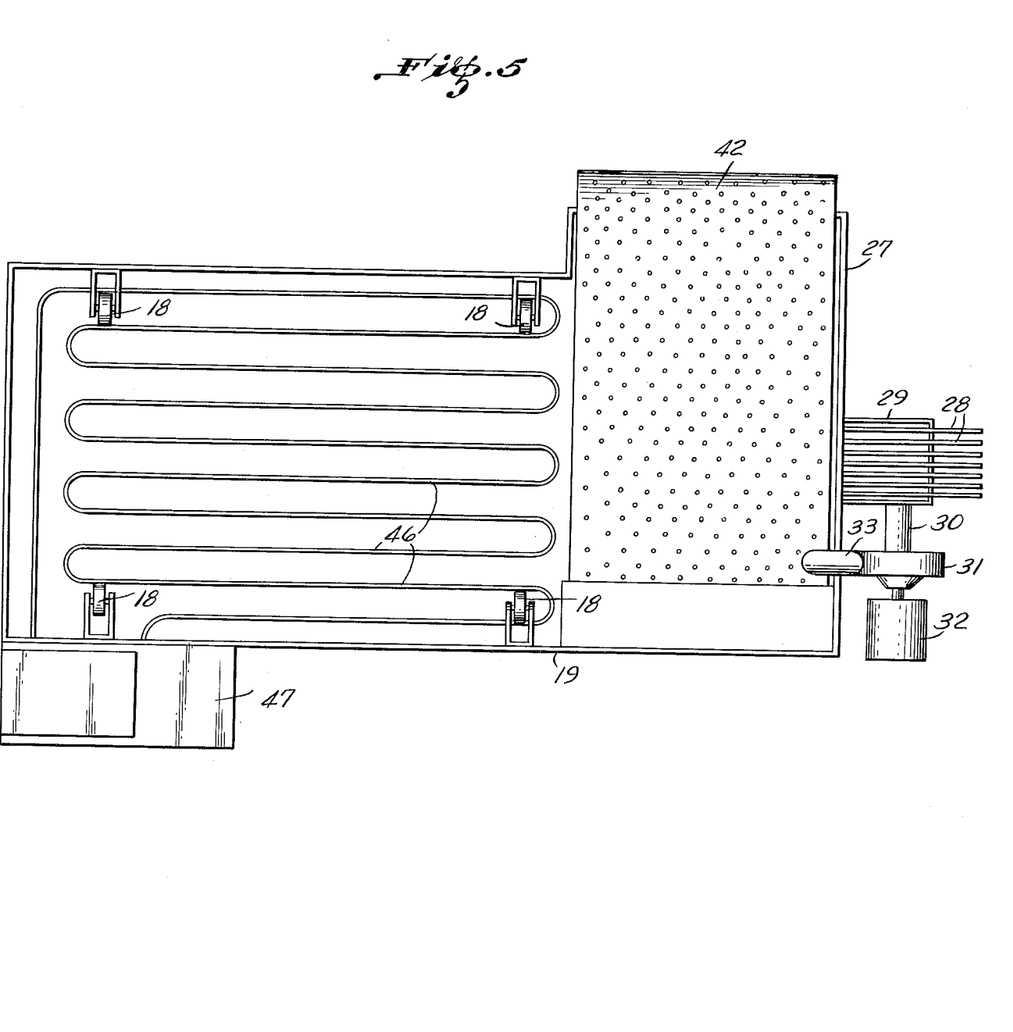
FIGURE 5 is a top plan view of the machine with the tumbling drum removed.

The whole frozen oysters delivered to the drum 17 will fall into the lower portion of the drum and encounter the spiral vanes 24. These vanes will lift the whole oysters incident to the rotation of the drum as illustrated in FIGURE 2 and at certain point in the rotation will drop the oysters off the vanes and upon the anvil 34. As shown in FIGURE 6 the anvil 34 is adjustable as to height so that is may be raised or lowered to achieve the proper distance of fall of the oysters. The impact of the fall will produce sheer stress in the oyster which will break open the shells and have the effect of shucking the oysters and also breaking the hinge ligaments and detaching the adductor muscles from the shell. The shells will fall on to the top run of the perforated conveyor belt 42 and be discharged from the tank at the right side thereof as shown in FIGURE 4. The frozen detached oyster meats will fall into the tank and float atop the liquid in the tank and will be drawn by the flow of fluid into the recovery flume 25 and discharged through the opening 26 on to the grid or inclined drain grate bars 28. The water discharging through the opening 26 will pass downwardly between the grate bars 28 into the catch basin 29 and recirculate to the tank 19 by the pipes 30, 33.

The lower portion of the tumbler drum 17 may or may not be partially immersed in the liquid in the tank 19. It could be supported so that its lower portion and all parts would be above the surface level of the liquid in which event the meats and shells would be discharged at the exit end of the tumbler into one end of the tank. In this case the shell removing conveyor 42 could extend the entire length of the tank. The meats and shells would be separately recovered from the tank in the same manner as previously described and illustrated.

The vanes 24 which are spirally mounted upon the cylinder wall of the drum 17 provide lift to the oysters and also aid in ejecting trash shell from the device. The vanes are preferably perforated to reduce resistance to rotation to the water or brine. The inclination of the drum or cylinder 17 is to provide for movement of the oysters and shell through the device.

The perforations in the belt 42 aid draining of the shells before the discharge over the sides of the tank.

The rods 28 are spaced to retain oyster meat while water or brine drains into the basin 29.

It will be noted that the anvil 34 extends above the flume 25 throughout the length of the drum 17 in which whole frozen oysters are dropped from the vanes 24. Therefore this anvil 34 protects the flume 25 and any oyster meats therein. Moreover the shape of the anvil is sloping from the ridge 37 in opposite directions along the plates 35, 36 so that any meat discharged from the shells by the impact process will not remain upon the anvil to be struck by subsequent falling oysters but will slide down the inclined plates into the water or brine bath in the tank 19.

Figure 7:
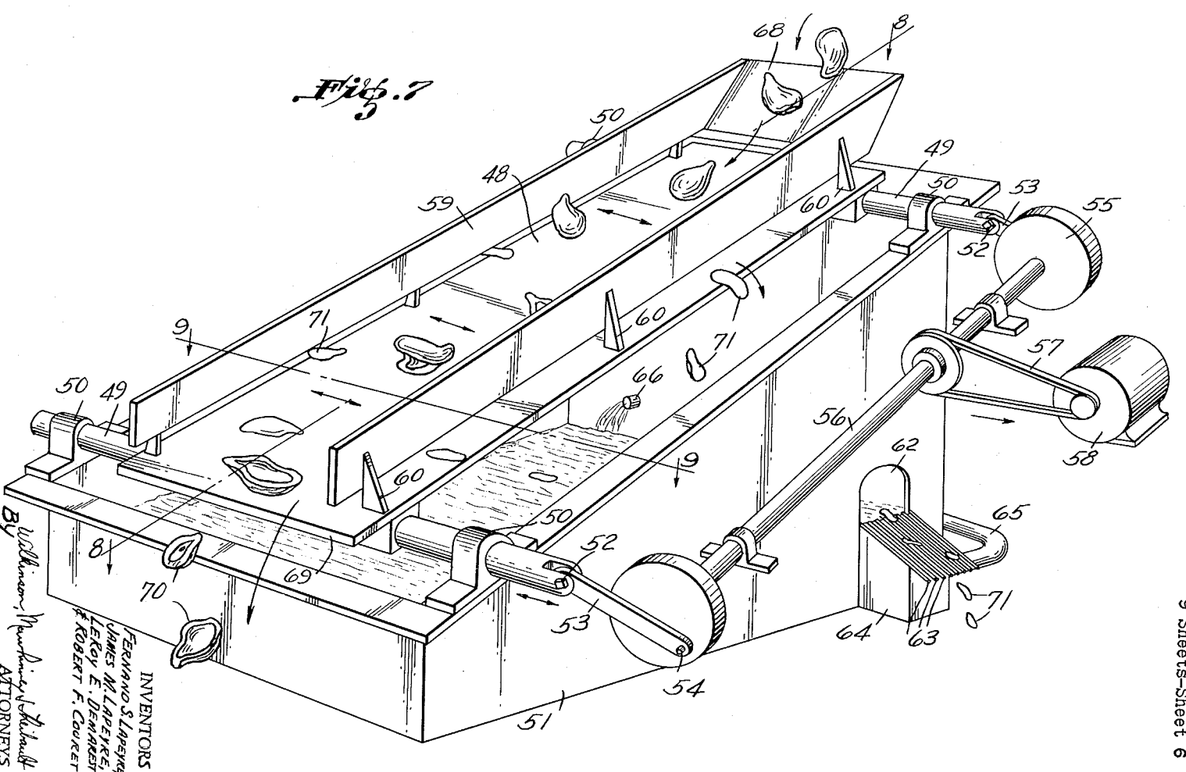
FIGURE 7 is an isometric view of a modified form of machine.
Figure 8:
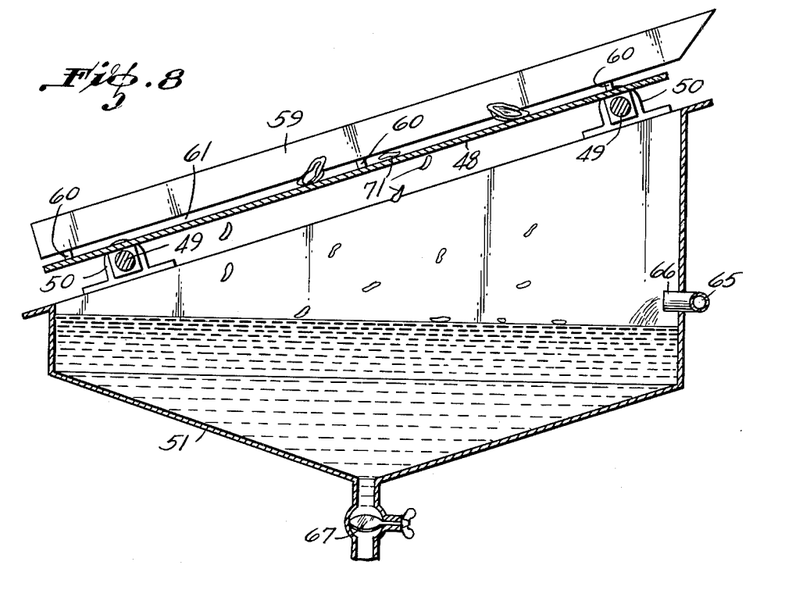
FIGURE 8 is a longitudinal sectional view taken through the same on the line 8—8 of FIGURE 7.
Figure 9:
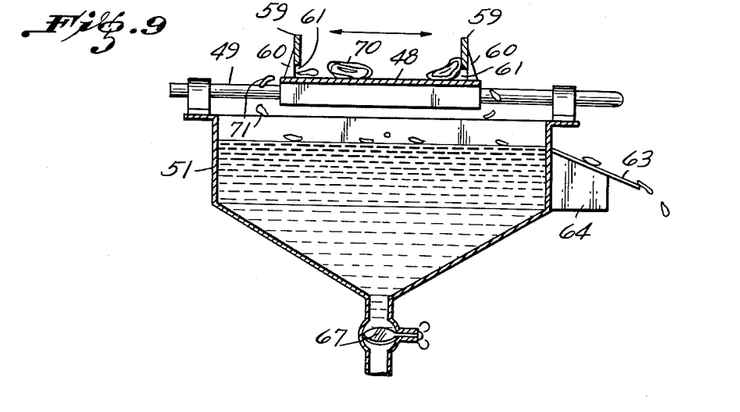
FIGURE 9 is a cross-sectional view taken on the line 9—9 of FIGURE 7.

Referring more particularly to FIGURES 7 to 9 inclusive, 48 designates a reciprocating slide plate or inclined plane which is affixed to reciprocating shafts 49 mounted in slip bearings 50 above a brine tank 51. The shafts 49 and slide plate 48 may be reciprocated by any appropriate means, one form of which is shown in FIGURE 7, where pivots 52 connect ends of the shafts 49 to pitmans 53, which in turn are connected by pivots 54 to rotary discs 55 affixed upon a drive shaft 56 appropriately supported at the side of the brine tank 51. The drive shaft 56 may be driven by pulley belt drive 57 from a motor 58 or by other suitable means.

Erected upon the slide plate 48 longitudinally thereof are side walls 59 carried by supports 60 so that clearance space or slots 61 are provided between the lower edges of the side walls 59 and the slide plate 48.

In one side wall of the brine tank 51 is an opening 62 at liquid level for the outflow of brine to carry the separated oyster meats to spaced inclined drain rods or a grate 63 above a drain basin 64. The basin 64 is connected by return pipe 65 to the tank 51, a pump being included in the line. The end of the return pipe 66 is shown as entering the brine tank 51 just above the liquid level, for which see FIGURES 7 and 8.

As shown in FIGURES 8 and 9, the lower portion of the brine tank 51 may be inclined or hopper-shaped to connect at its lowest point with a drain having a drain valve 67 therein to flush out chip sediment.

In the operation of this form of the invention the frozen whole oysters are introduced at the induction end of the slide plate 48, which together with the side walls 59 constitutes a trough which is reciprocated at high speed, causing the side walls 59 to strike the whole oysters with great force. The shells will thereby be opened and the frozen oyster meats discharged therefrom. The clearance spaces or slots 61 will be adjusted to permit the passage of the oyster meats which may thereupon fall into the brine solution, such frozen meats being indicated at 71. Such oyster meats are subsequently flowed off through the opening 62 to the spaced rods or grate 63, the water draining therefrom into the basin 64 and being returned by the pipe 65 to the tank 51. The oyster meats 71 slide off the grid 63 and are caught in a suitable container or conveyor. The oyster shells 70 are too large to pass through the clearance openings or slots 61 and are therefore retained in the trough until they are discharged at the lower end 69 thereof.

Due to the inclination of the trough and the movement imparted thereto the oysters and the empty shells will be gradually moved longitudinally of the trough from the induction end 68 to the empty shell discharge 69. It will be noted that the trough is narrower than the tank 51 so as to assure that the freed oyster meats 71 will fall into the brine solution in the tank 51 no matter what the lateral position of the trough at any particular time.

The slide plate 48 may be hard surfaced to permit the same to slide under the oysters particularly when the movement of the trough is reversed so that the oysters may not be carried from side to side with the trough which would have a diminishing effect upon the impact and the sheer force to be developed by the side walls 59 upon the whole oysters. The step of freezing the oysters and the further subsequent step of subjecting the oysters to blows by the side walls 59 will not only result in the opening of the oysters but also the detachment of the hinge ligaments and the adductor muscles.

The brine level in the tank can be maintained by well-known float valve control supplying brine from reservoir.

Referring more particularly to that form of the invention shown in FIGURES 10 to 13 inclusive, 72 designates one or more rotary paddle wheels 72 mounted upon shafts 73 journaled in bearings 74 above the brine tank 51ª. The shafts 73 may be driven by an electric or other motor 75 through the intermeshing pinions 76, 77 or other form of transmission.

Above the paddles 72 is arranged a curved shield 78, the longitudinal edges of which are in spaced relation to the side plates 79 which have inwardly extending stop or anvil lips 80 at their upper longitudinal edges.

Figure 10:
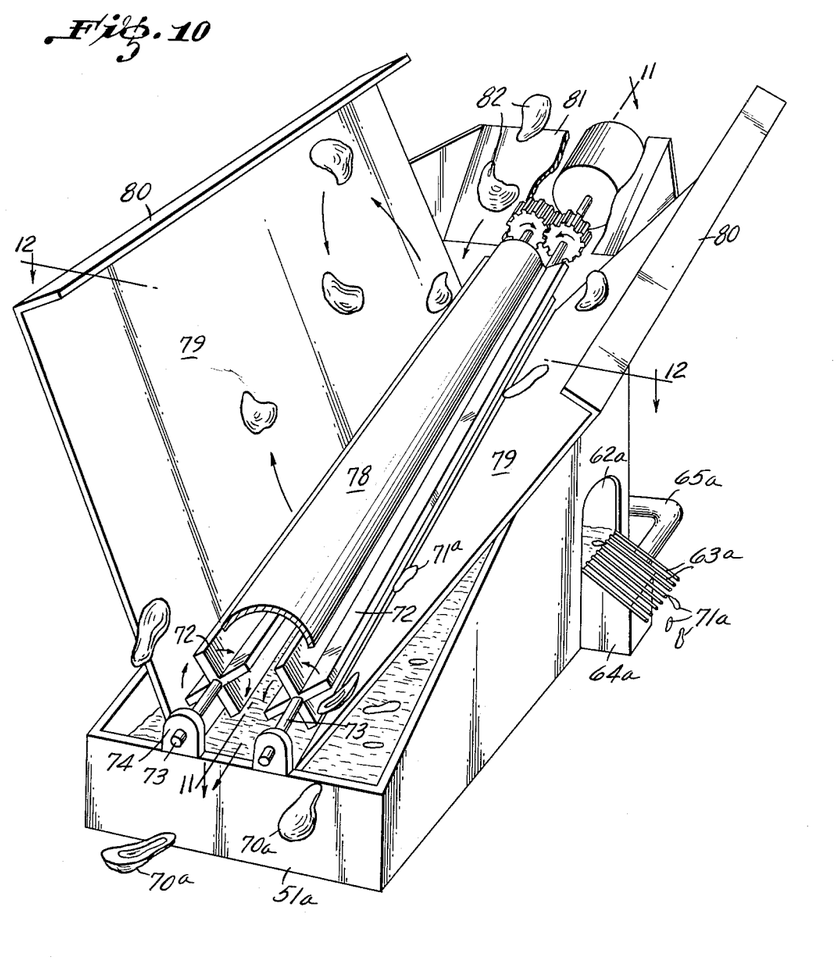
FIGURE 10 is an isometric view of a still further modified form of the machine.

The device is preferably inclined from a higher induction end 81 at which the whole oysters 82 are introduced as shown more particularly in FIGURE 10.

In the use of this form of the invention, as the whole oysters 82 slide by gravity down the inclined trough provided between the shield 78 and each side wall 79, such whole oysters are permitted to descend upon the paddles 72 which are constantly rotating, in the directions indicated by the arrows in FIGURE 10. These paddles are preferably rotated at high r.p.m. and consequently the radial paddles will strike the oysters with considerable force. The paddles are preferably of metal, due to the direction of rotation and the speed of rotation the striking of the oysters by the paddles causes the same to be driven with considerable force up against the stop lips 80 of the side plates 79. The oysters therefore receive impact not only by the paddles 72 but also from the lips 80. It will of course be understood that the oysters are received into the device in a frozen or substantially frozen condition and that freezing units may be mounted adjacent the induction end 81 for convenience in delivering frozen oysters to the device, and a freezing unit may also be mounted adjacent to the induction end of the reciprocating trough of FIGURE 7.

Figures 11, 12, 13:
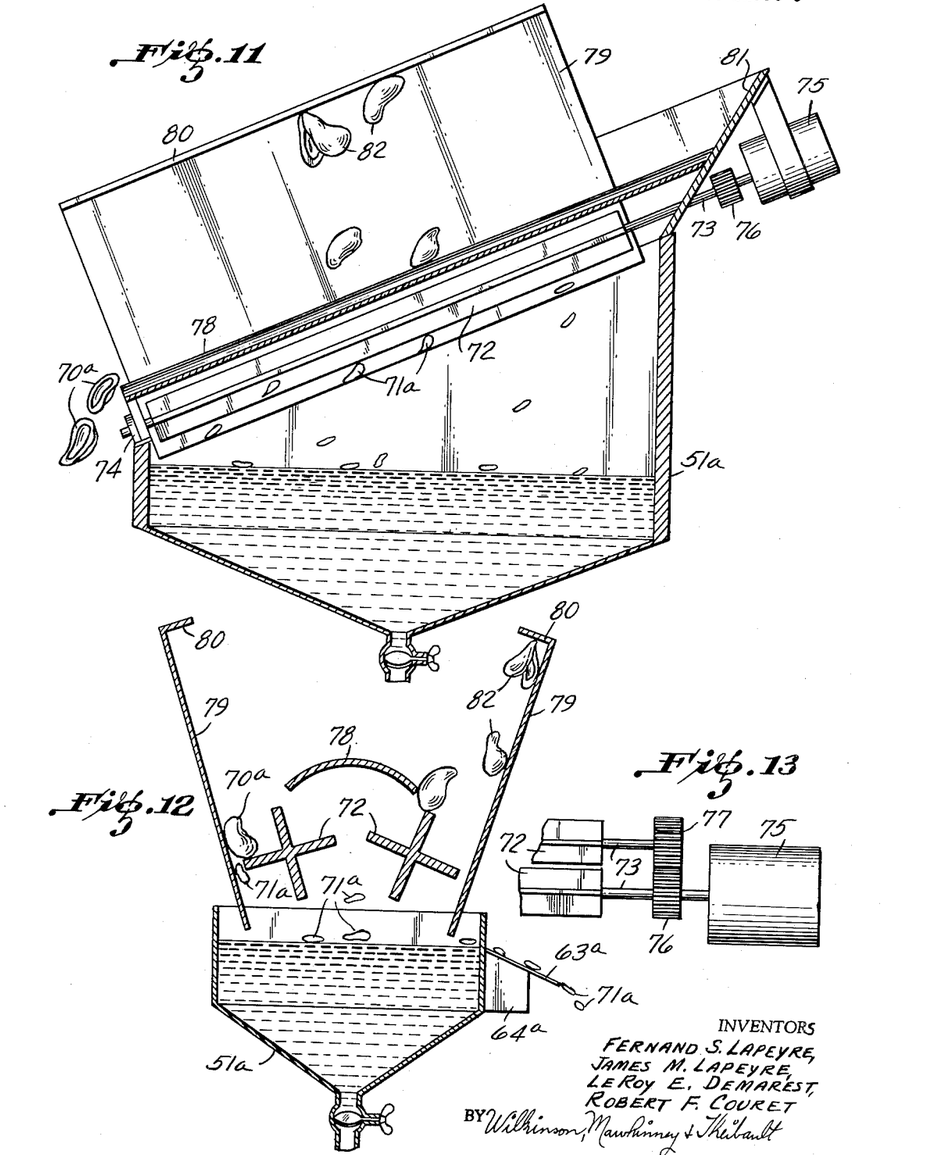
FIGURE 11 is a longitudinal sectional view taken on the line 11—11 of FIGURE 10.
FIGURE 12 is a cross-sectional view taken on the line 12—12 of FIGURE 10.
FIGURE 13 is an enlarged fragmentary plan view of a detail of the paddle drive.

As shown in FIGURE 12, the paddles 72 are so adjusted with reference to the side plates 79 that clearance space is provided between the paddles and the side plates of a gauge or distance sufficient to permit the meats 71$^a$ to pass downwardly into the brine in the tank 51$^a$, but rejecting the empty shells 70$^a$. These shells must therefore slide down the whole length of the trough and be discharged as indicated in FIGURE 10 at the lower eduction end of the trough. FIGURE 12 also shows the meats 71$^a$ as being floated off free of shell to the grid or spaced rods 63$^a$. As shown in FIGURE 10, the brine tank is provided with an opening 62$^a$ for the floating off of the frozen oyster meats. FIGURE 10 also illustrates a catch basin 64$^a$ and a return pipe 65$^a$ which has a pump therein for recycling the brine solution from the catch basin 64$^a$ to the brine tank 51$^a$.

In addition to the above-described processes for the removal of the oyster meat from the shell, the process may, in alternative form, consist of first, freezing the oyster, secondly subjecting the oyster to a partial thaw whereby adherence between the frozen oyster meat and the interior of the shell is broken and then tumbling the oyster as hereinabove described or otherwise shucking the same.

We have found that when subjecting the frozen oyster to the sheer stress in our machine, one of the half-shells falls free of the oyster quite some little time before the second half-shell drops free from the oyster meat. Since oysters on the half-shell are considered a delicacy, an operator of our machine could take advantage of this differential in time between the partial and total shucking of the oyster to retrieve the oyster in its partially shucked state, and carry on with the rest of the process which would be normal to the marketing of the oyster, namely, the return of the oyster on its half-shell to the freezer for additional hard freezing and then packaging for later distribution.

The proportion of partially shucked oysters to fully shucked oysters may be controlled by the speed of rotation of the tumbler 17, that is, by increasing the speed of the motor 23 or decreasing its speed whereby the shaft 22, having the pulleys 21 and drive belts 20 thereon, will cause the tumbler 17 to either increase or decrease in its speed of rotation. This variation in speed of tumbler rotation would affect the period of time that the oysters would be subject to the combination thawing and impact actions which take place on the oysters while being carried through the tumbler. When the tumbler rotation speed is reduced or slowed down, the oysters would be subjected to more complete shucking, and where the tumbler is speeded up the oysters would be subjected to reduced shucking action.

Another means by which the proportion of partially shucked to fully shucked oysters could be controlled would be by controlling the temperature of the brine in the tumbler. Where the temperature of the brine is kept very low the thawing action on the oysters would be slower than where the temperature of the brine is somewhat higher.

A still further means by which the proportion of the partially shucked to fully shucked oysters could be controlled would be by varying the temperature and/or volume of the air which might be circulated through the tumbler above the level of the brine.

Although we have disclosed herein the best form of the invention known to us at this time, we reserve the right to all such modifications and changes as may come within the scope of the following claims.

What is claimed is:

1. The process of treating oysters consisting in freezing the live oysters in their shells, and thereafter subjecting the oysters to shear stress while the oysters begin to thaw to open the shells and release the meat in frozen condition including the water and juice content.

2. The process of treating oysters consisting in freezing the live oysters within their shells, thereafter subjecting the frozen oysters to shear stress through impact to shuck the same, and separating the frozen meats from the opened shells.

3. The process of treating oysters consisting in freezing the live oysters within their shells, thereafter subjecting the frozen oysters to a partial thaw whereby adherence between the frozen oysters meat and the interior of the shell is broken, and thereupon thereafter shucking the partially thawed oysters.

4. The process for recovering whole oyster meats in fresh raw condition to and including substantially all liquid content consisting in freezing the raw oysters including the meat together with the water and juice content into solid form having a freezing attachment to the valves, thereafter partially thawing to break the freezing adherence between the frozen meat and valves, and thereupon shortly thereafter separating the valves to yield the meat and liquid content in frozen solid form raw and fresh.

5. The process of treating oysters consisting in freezing live oysters within their shells, subjecting the frozen and still wholesome oysters to a partial thaw, whereby adherence due to freezing between the frozen oyster meat and the interior of the shell is eliminated, and shucking the partially thawed oysters.

6. The process of treating oysters consisting in freezing live oysters within their shells to preserve their wholesomeness, subjecting the frozen and still wholesome oysters to a partial thaw, whereby adherence due to freezing between the frozen oyster meat and the interior of the shell is eliminated but the adductor muscle of the oyster remains substantially rigid to prevent the natural flexing thereof, shucking the partially thawed oysters to shear the rigid adductor muscle from the shells.

7. The process of treating oysters comprising freezing live oysters within their shells, subjecting the frozen and still wholesome oysters to a partial thaw whereby adherence due to freezing between the frozen oyster meat and the interior of the shell is partially eliminated, subjecting the partially thawed oysters to an impact shock at an impact rate to partially shuck some of the oysters and to wholly shuck others.

8. The process of treating oysters comprising freezing live oysters within their shells to preserve their wholesomeness, subjecting the frozen and still wholesome oysters to a partial thaw whereby adherence due to freezing between the frozen oyster meat and the interior of the shell is eliminated but the adductor muscle of the oyster remains substantially rigid to prevent the natural flexing thereof, partially shucking some of said partially thawed oysters to shear the rigid adductor muscle from one of each of the oyster shells.

9. The process of treating oysters comprising freezing the live oysters in their shells and shortly thereafter subjecting the oysters to shear stress while the oysters begin to thaw to remove at least one of the shells from the oyster leaving the oyster meat in a frozen condition in the other shell with the adductor muscle attached to the shell including the water and juice content.

10. The process of treating whole oysters frozen while in the live state to solidify the meat and juices within the closed shells, consisting in subjecting the frozen oysters to a partial thaw whereby adherence between the frozen oyster meat and the interior of the shell is broken but otherwise maintaining the solid frozen condition of the oyster meats and juices up to the time of shucking, and thereafter shucking the partially thawed oysters.

References Cited in the file of this patent

UNITED STATES PATENTS

| | | |
|---|---|---|
| 1,161,811 | Horn et al. | Nov. 23, 1915 |
| 2,008,820 | Doxsee et al. | July 23, 1935 |
| 2,102,945 | Doxsee et al. | Dec. 21, 1937 |
| 2,110,801 | Hopkinson | Mar. 8, 1938 |
| 2,234,157 | Jones | Mar. 4, 1941 |
| 2,303,919 | Dobbs | Dec. 1, 1942 |
| 2,608,716 | Harris | Sept. 2, 1952 |
| 2,652,588 | Harris | Sept. 22, 1953 |
| 2,824,006 | Strasburger et al. | Feb. 18, 1958 |

FOREIGN PATENTS

| | | |
|---|---|---|
| 660,960 | Great Britain | Nov. 14, 1951 |

OTHER REFERENCES

"The Freezing Preservation of Foods," 1943, by D. K. Tressler et al., published by the Avi Publishing Co., Inc., pp. 489 to 494, inclusive, article entitled Preparing Oysters for Freezing.